Jan. 15, 1952 G. SCHER 2,582,656
APPARATUS FOR FEEDING LENGTHS OF FLAT STOCK
IN UNINTERRUPTED SEQUENCE
Filed June 7, 1947 8 Sheets-Sheet 1
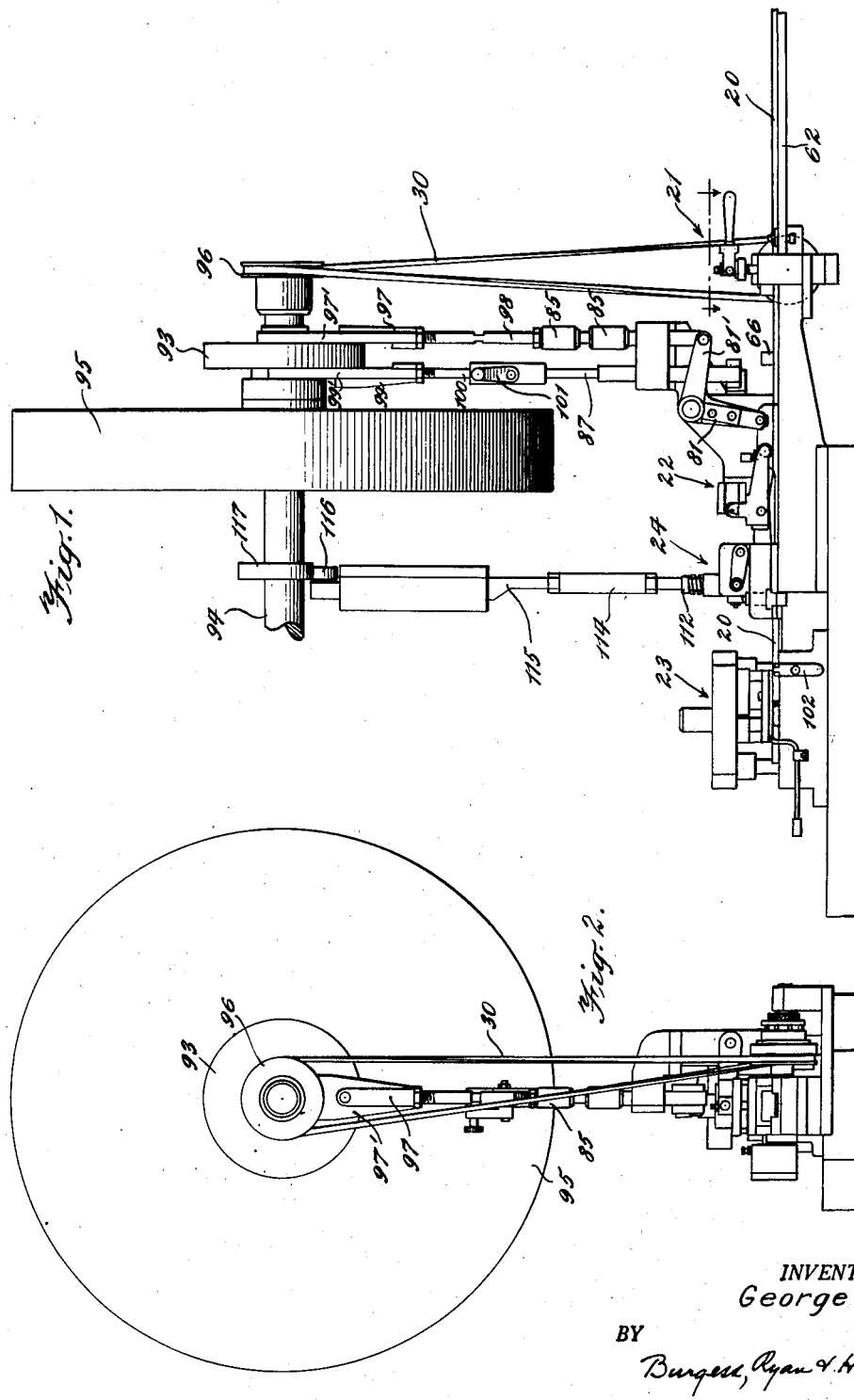
INVENTOR.
George Scher
BY
Burgess, Ryan & Hicks
ATTORNEYS

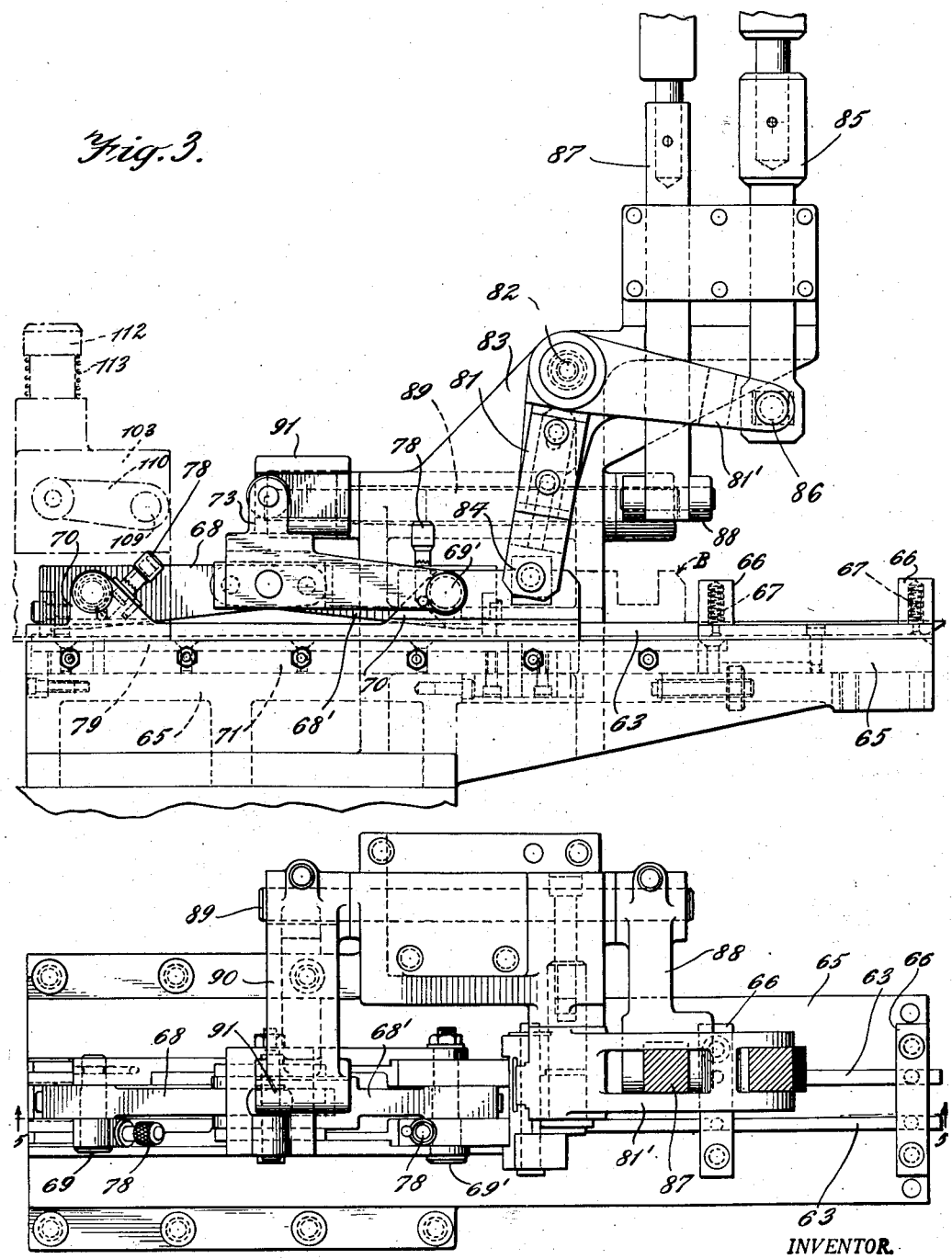

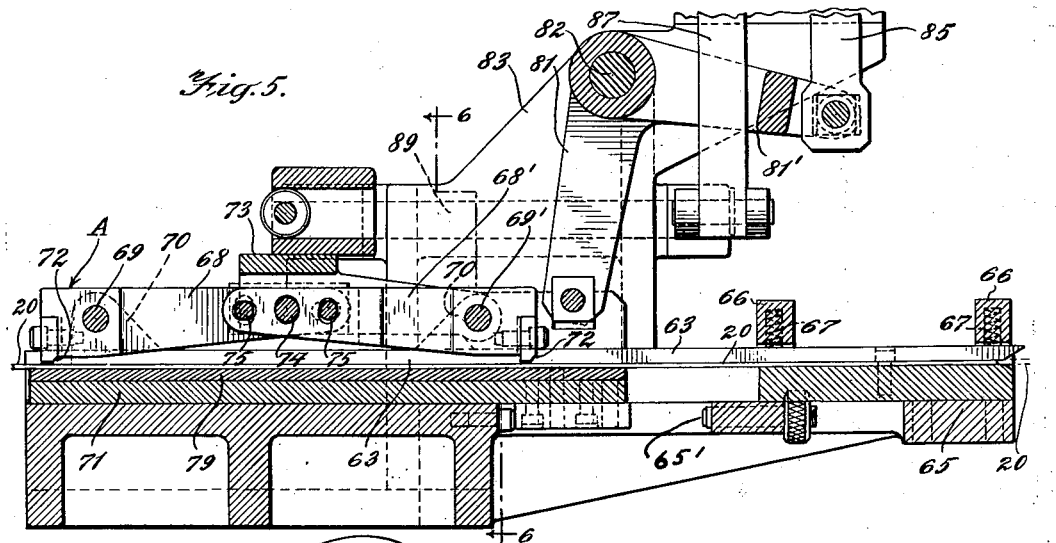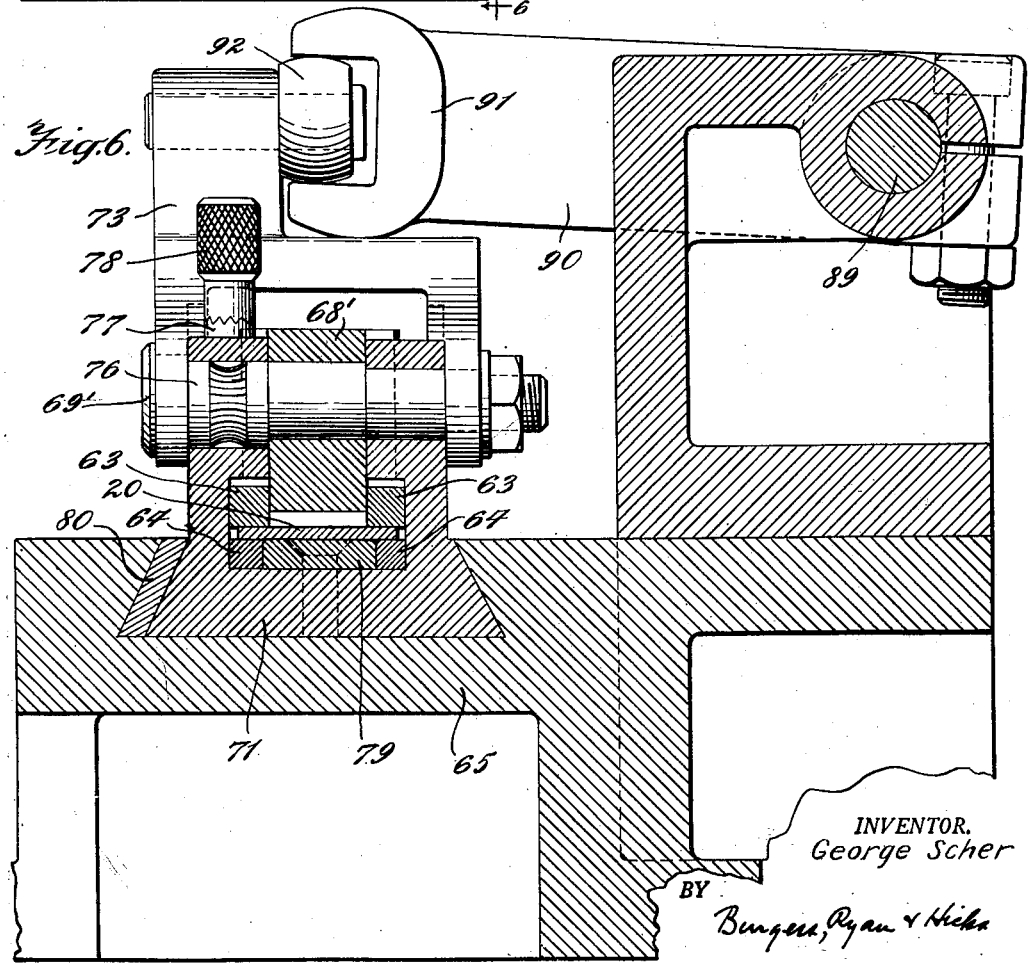

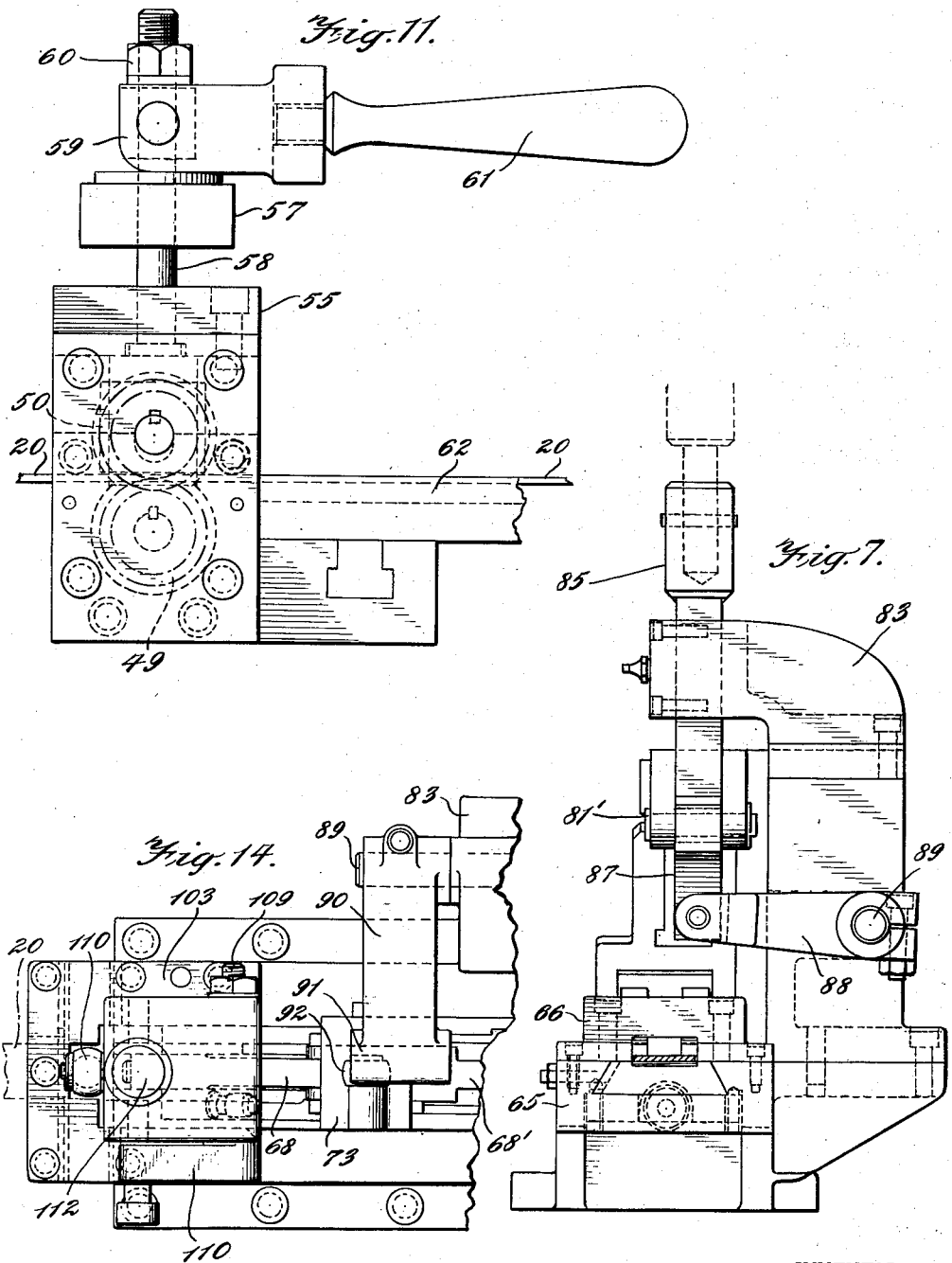

Jan. 15, 1952   G. SCHER   2,582,656
APPARATUS FOR FEEDING LENGTHS OF FLAT STOCK
IN UNINTERRUPTED SEQUENCE
Filed June 7, 1947   8 Sheets-Sheet 5
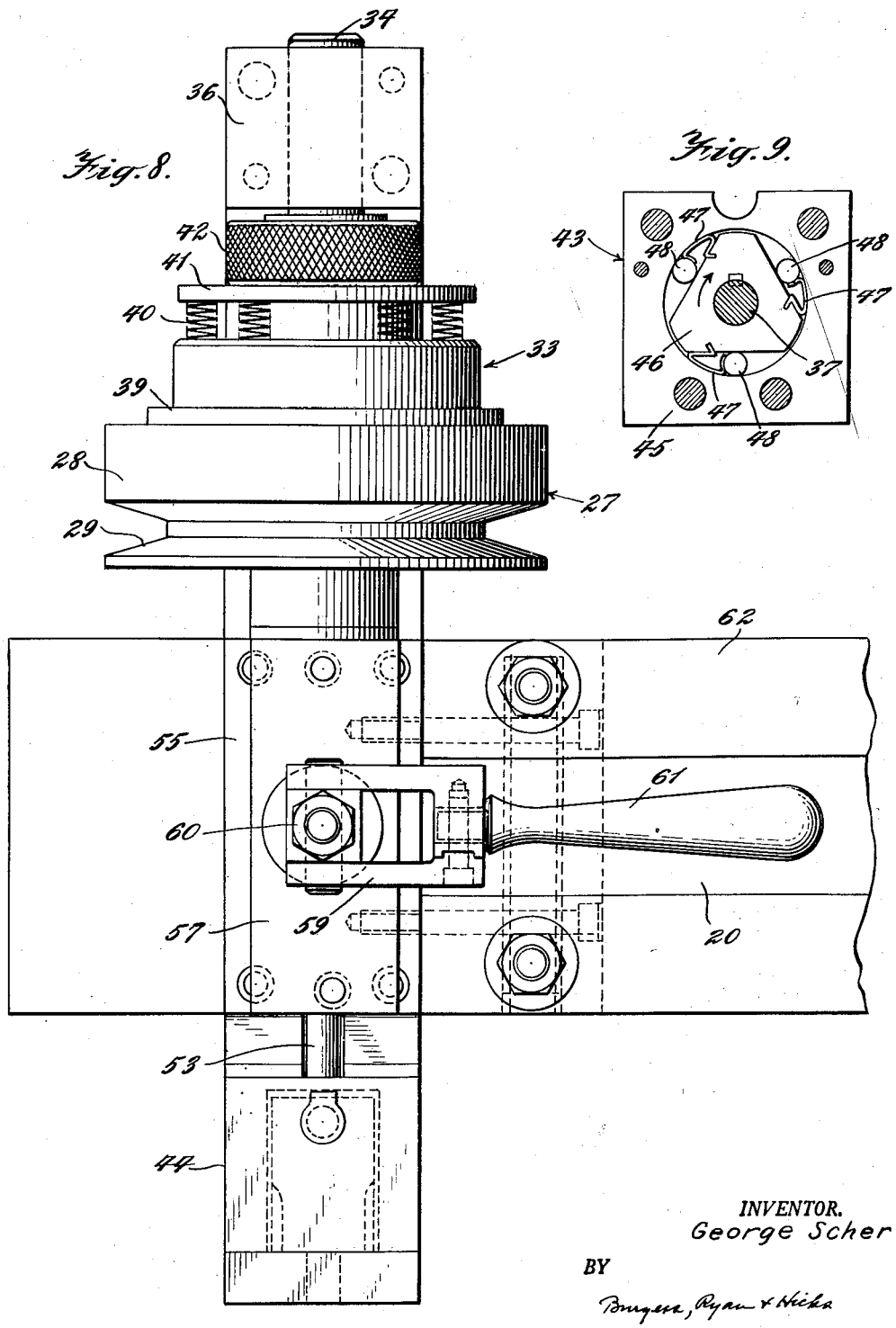
INVENTOR.
George Scher
BY
ATTORNEYS

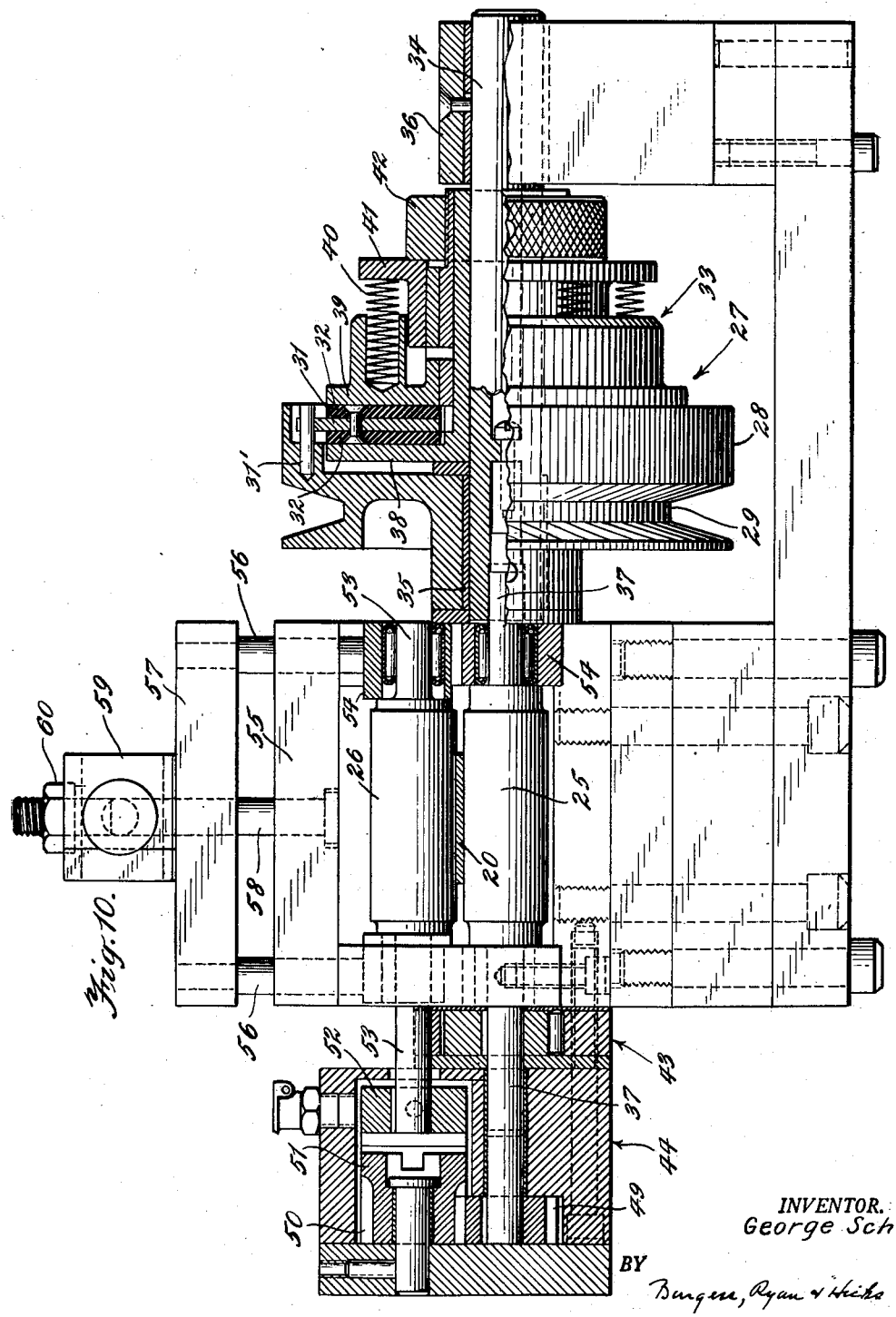

Jan. 15, 1952 G. SCHER 2,582,656
APPARATUS FOR FEEDING LENGTHS OF FLAT STOCK
IN UNINTERRUPTED SEQUENCE
Filed June 7, 1947 8 Sheets-Sheet 7
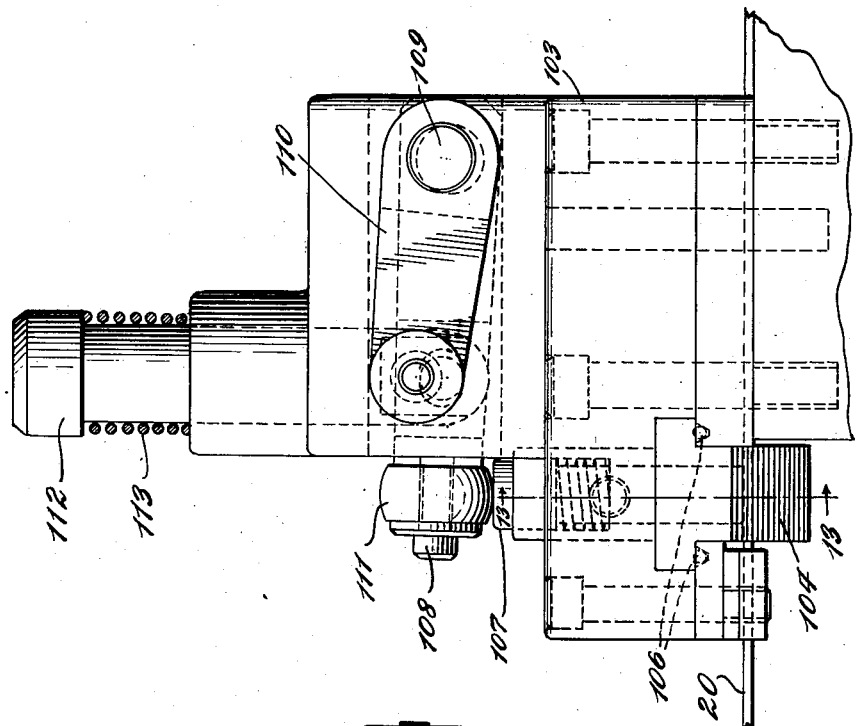
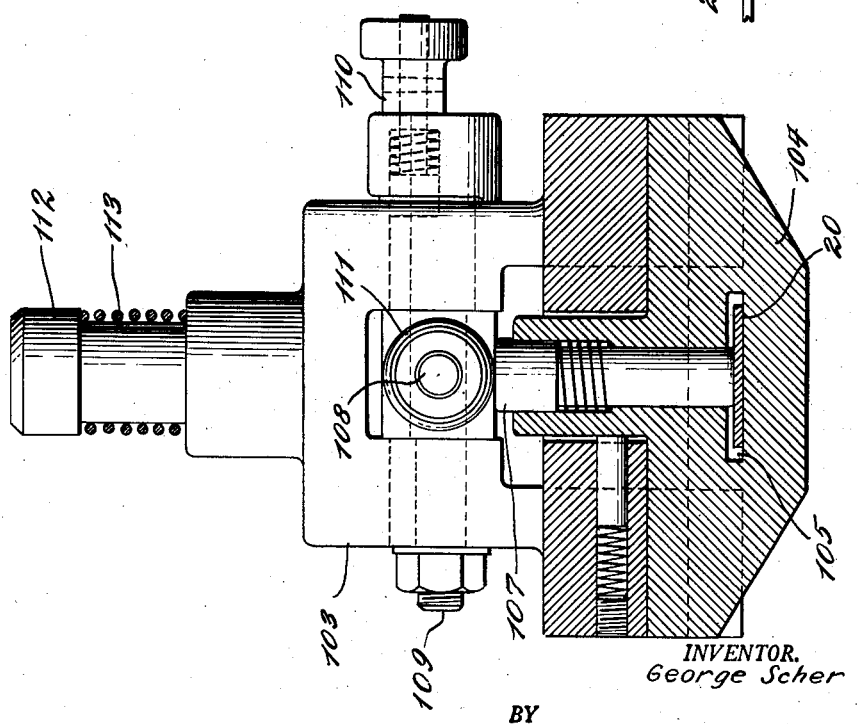
INVENTOR.
George Scher
BY
Burgess, Ryan & Hicks
ATTORNEYS

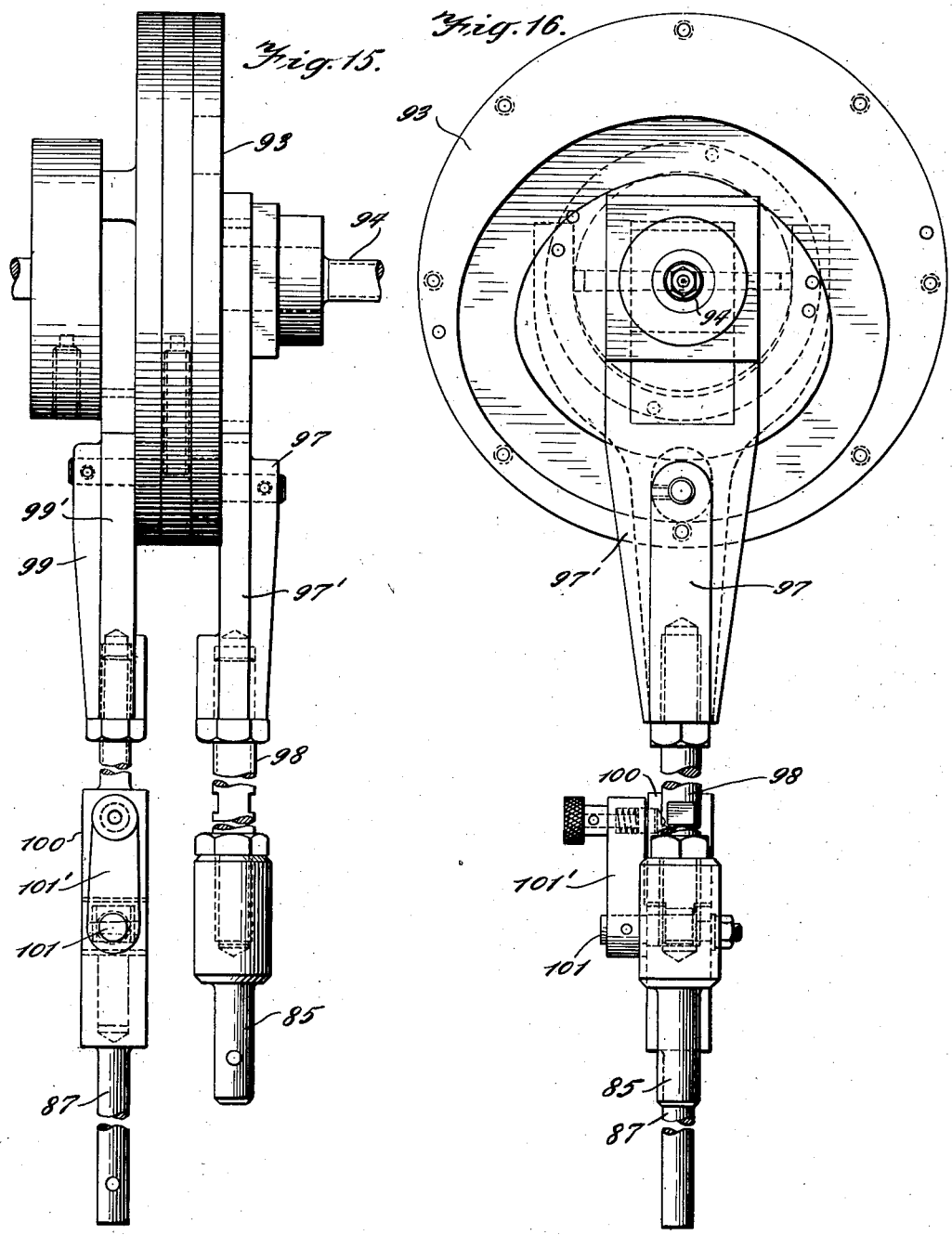

Patented Jan. 15, 1952

2,582,656

UNITED STATES PATENT OFFICE 2,582,656

APPARATUS FOR FEEDING LENGTHS OF FLAT STOCK IN UNINTERRUPTED SEQUENCE

George Scher, West Orange, N. J.

Application June 7, 1947, Serial No. 753,179

16 Claims. (Cl. 271—69)

This invention relates to an apparatus for the continuous feeding of strip stock and more particularly to an apparatus for continuously advancing strip stock step-by-step for a predetermined distance in each step.

The objects and advantages of the invention will be apparent and best understood from the following description and the accompanying drawings in which:

Fig. 1 is a side view illustrating the general layout of a strip stock feeding apparatus embodying the invention in conjunction with a punch press;

Fig. 2 is an end view of the apparatus shown in Fig. 1;

Fig. 3 is a side view of a reciprocating feed mechanism for intermittently advancing strip stock a predetermined distance for each reciprocation;

Fig. 4 is a plan view of the apparatus shown in Fig. 3 having certain parts omitted for clarity;

Fig. 5 is a section view taken approximately along the line 5—5 of Fig. 4;

Fig. 6 is a section view taken approximately along the line 6—6 of Fig. 5;

Fig. 7 is an end view of the apparatus shown in Fig. 3;

Fig. 8 is a plan view of a slip-feed for continuously feeding lengths of strip stock in end to end relation to the reciprocating feed mechanism;

Fig. 9 is an end view in partial section of a portion of the slip-feed shown in Fig. 8;

Fig. 10 is an end view in partial section of the slip-feed shown in Fig. 8;

Fig. 11 is a side view of the slip-feed shown in Fig. 8;

Fig. 12 is a side view of a compensating hold-down mechanism for the strip stock;

Fig. 13 is a section view taken approximately along the line 13—13 of Fig. 12;

Fig. 14 is a plan view showing the compensating hold-down in conjunction with the reciprocating feed;

Fig. 15 is a side view of an operating mechanism for the reciprocating feed; and Fig. 16 is an end view of the mechanism shown in Fig. 15.

Referring now to the drawings in detail, the general arrangement of a strip feed embodying the present invention is shown in Figs. 1 and 2 in conjunction with a punch press 23 as illustrating the type of machine to which the feed may be applied. Strip stock 20, in either coiled or flat form, is fed by a continuously driven slip-feed, indicated generally at 21, to a reciprocating feed mechanism, indicated generally at 22, that intermittently grips the stock and advances it a predetermined distance.

The reciprocating feed mechanism 22 advances the stock 20 into position for operation thereon by the dies of the punch press 23 or similar machine. During its return stroke, the reciprocating feed mechanism 22 releases the stock which is then held in its advanced position by a positively operated, compensating hold-down indicated generally at 24. The compensating hold-down 24 permits the stock 20 to be aligned properly with the dies of the punch press 23 and corrects for camber in the stock such as may occur in cutting the stock from sheets.

Lengths of the stock 20 are continuously fed by the slip-feed 21 in end to end or abutting relation to a point where the stock may be engaged by the reciprocating feed mechanism 22. The slip-feed is constantly driven so as to maintain the lengths of stock in abutting relation as the stock is fed forward. This permits the uninterrupted feeding of flat strip stock in the usual lengths of about six feet.

The reciprocating feed mechanism 22 grips the stock at two points spaced from each other. Thus, as a new length of stock is fed to the point where it is engaged by the reciprocating feed, both the new stock and the preceding length of stock will be positively gripped and advanced thereby. The gripping mechanism of the reciprocating feed is constructed to compensate for variations in the gauge of an individual length of stock or in adjoining lengths of stock.

The details and operation of the various mechanisms referred to briefly above are described in detail hereinafter in their approximate sequence of operations.

*The continuously driven slip-feed*

The continuously driven slip-feed 21 is best shown in Figs. 8, 9, 10 and 11 and has a pair of pinch rolls 25 and 26 between which the stock 20 is gripped and fed forward. The lower roll 25 of the pair may be driven from any suitable source of power through a slip drive indicated generally at 27.

In the type of slip drive 27 illustrated, there is a friction clutch which has a driving member 28. The driving member 28 has a pulley 29 formed as a part thereof which is driven through a V-belt 30, as shown in Fig. 1. The V-belt 30 may be driven in any suitable manner as described hereinafter. The driving member has a clutch disc 31 secured thereto by drive pins 31' and the driving faces of the clutch disc 31 are lined with friction material 32 of the usual type.

A driven member 33 of the clutch is keyed to a shaft 34 on which the driving member 28 is rotatably supported on a sleeve 35. One end of the shaft 34 is supported in a bearing 36 and the other end of the shaft 34 which is hollow, is supported on and keyed to a shaft 37 extending from the lower roll 25. The driven clutch member 33 is slidable on the shaft 34 and carries a flange 38 that engages with one face of the driving disc 31. The other face of the driving disc 31 is engaged by a flanged member 39 slidably carried on the driven clutch member 33. The flanged member 39 is held in frictional engagement with the friction facing on the disc 31 by a series of springs 40 so that the driving disc 31 is clamped between the two flanges engaging therewith. The springs 40 are held against the flanged member 39 by an adjustable collar 41. The position of the collar 41 and the resulting compression of the springs 40 which force the flanges 38 and 39 into engagement with the driving disc 31 may be controlled by a knurled adjustment nut 42 so as to regulate the slippage of the clutch as desired.

The shaft 37 extends from the opposite side of the lower roll 25 through a one-way drive 43 into a gear box 44. In the type of one-way drive illustrated in Fig. 9, there is a frame 45 with a circular opening therein in which a triangularly shaped member 46 rotates. The triangularly shaped member 46 is keyed to and rotates with the shaft 37. The sloping sides of the triangularly shaped member 46 are provided with spring fingers 47 and rollers 48. The triangularly shaped member 42 thus may rotate in one direction in the frame 45, i. e., to feed the stock forward but, upon movement in the reverse direction, the rollers 48 and the spring fingers 47 are wedged between the sloping sides of triangularly shaped member 46 and sides of the circular opening in the frame 45. This prevents the shaft 37 from turning in any direction other than to advance the stock 20 and holds the stock at whatever advanced position it may have reached.

A pinion gear 49 secured to the shaft 37 meshes with a gear 50 formed on an element 51 of a coupling, commonly known as an Oldham type coupling, which permits axial displacement of the parts connected by it. The other element 52 of the coupling is secured to the end of a shaft 53 that drives the upper roll 26.

The shafts 37 and 53 for the rolls 25 and 26, respectively, are journalled in bearings 54 that are supported in a frame 55. The bearings 54 for the upper roll 26 are slidably mounted in the frame 55 and are held in place by supporting rods 56 which are connected by a cross-bar 57. A stud 58 extends from the top of the frame 55 through the cross-bar 57. A camming member 59 is secured to the stud 58 above the cross-bar 57 by an adjustable nut 60. The camming member 59 has a pivoted mounting and is provided with a handle 61 so that its camming surfaces may be brought to bear on the cross-bar 57 to bring the roll 26 into or release the roll from engagement with the stock 20. When the roll 26 is released, it may move upwardly so that stock may be easily removed from or inserted between the rolls. The adjustment nut 60 permits the rolls to be adjusted to accommodate various gauges of stock. During normal operation of the feed, the cam 59 is positioned, as shown in the drawings, to hold the rolls in engagement with the stock 20 so as to feed the stock forward.

Lengths of stock 20 may be introduced between rolls 25 and 26 by sliding the stock along a table or platform 62, the top of which is aligned with the rolls. As a length of stock enters the rolls after the preceding length of stock has left the rolls, the new length of stock will be fed forward rapidly until it abuts the end of previous length of stock. Thereafter, the slip-feed automatically maintains the stock in abutting relation with the end of the preceding length of stock as it is intermittently advanced. When the stock is held against continued forward movement by other parts of the feed, the friction drive slips while holding the stock in such advanced position as it has reached, and the one-way drive prevents the stock from moving back if there is any tendency for it to do so.

*The reciprocating feed mechanism*

The reciprocating feed mechanism 22 is shown in Figs. 3, 4, 5, 6 and 7. The stock-gripping mechanism is reciprocated in appropriately timed relation to the operation of the punch press 23 or like machine between an advanced position as shown in the drawings, and a retracted position as indicated at B by the dotted lines in Fig. 3. This mechanism advances the stock a predetermined distance for each reciprocation.

The slip-feed 21 feeds the stock 20 to the reciprocating feed between upper guide rails 63 and lower guide rails 64 that are aligned with the slip-feed to receive the stock therefrom. The lower guide rails 64 are supported on a bed plate or support 65 to which the upper rails 63 are secured by cross-bars 66. Springs 67 in the cross-bars 66 bear against the upper guide rails 63 and hold the upper guide rails against the stock which rests on the lower rails 64. The spring-held upper rails 63 are thus self-adjusting for various gauges of stock and the leading end of the upper guide rails is bevelled so that stock may enter between the rails without interference.

The reciprocating feed is provided with two levers 68 and 68' that grip the stock at spaced points, thus insuring the gripping and positive advancement of adjoining lengths of stock. The levers 68 and 68' are pivoted on eccentric shafts 69 and 69' which are journalled in upstanding sides 70 of a reciprocable frame 71. The levers 68 and 68' are generally similar except that one end of the lever 68' may be bifurcated and extend on either side of the lever 68 when the levers are assembled in operative relation.

Each of the levers 68 and 68' has a stock-gripping jaw 72 secured thereto at its free end. The other ends of the levers are connected together by a common operating yoke 73. The yoke 73 may be pivotally supported on portions of the eccentric shaft 69' that are concentric with the bearing portions of the shaft.

The levers 68 and 68' pivot about the shafts 69 and 69' so that movement of the yoke 73 will move the stock-gripping jaws 72 on the levers into gripping engagement with the stock 20 when the yoke 73 is raised, and release the stock when the yoke is depressed. The levers 68 and 68' are connected to the yoke 73 by a central pin 74 on which the levers may turn and by side pins 75 that extend through appropriately shaped openings in the levers to permit radial movement of the levers.

The shafts 69 and 69' each have a geared portion 76 thereon constituting the wheel of a worm and wheel arrangement by means of which the shafts may be turned in their supports 70 so as to raise or lower the eccentric lever-supporting portions thereof. Worms 77 supported in the frame 71 and provided with adjustment knobs 78 engage with the wheels 76. By turning the knobs 76 in appropriate directions, the shafts 69 and 69' may be turned to raise or lower their eccentric portions relative to the bottom of the reciprocable frame 71, and thus raise or lower, as required, the stock-gripping jaws 72 to accommodate various gauges of stock.

The stock-gripping jaws 72 are opposed to a hardened steel plate 79 carried by the reciprocable frame 71 and the stock 20 is gripped between the jaws 72 and the plate 79 as it is advanced. As shown in Fig. 6, the reciprocable frame 71 is slidably mounted in a groove in the support or bed plate 65. The groove has sloping sides and the frame 71 has a sliding fit therein provided by means of a gib 80. An adjustable stop 65' carried by the bed plate 65 stops the rearward movement of the frame 71 at its retracted position.

The frame 71 and the stock-gripping members associated therewith are reciprocated in appropriately timed relation to the operation of the punch press 23 by a bell crank lever 81. The bell crank lever 81 is mounted on a pivot 82 supported from a supporting bracket 83 and has a sliding connection 84 with the rear of the frame 71 that permits linear movement of the frame.

The bell crank lever 81 is rocked about its pivot by a connecting rod 85 that may be operated in any suitable manner. The connecting rod 85 has a sliding connection 86 with an arm 81' of the bell crank lever 81 that permits rocking or radial movement of the bell crank lever. The arm 81' of the bell crank lever 81 is bifurcated and extends on either side of a connecting rod 87 for operating the yoke 73.

The yoke-operating connecting rod 87 is connected to one end of a rock shaft 89 by a lever 88. The rock shaft 89 is journalled in the frame 83 and carries an arm 90 with a grooved guide member 91 at its end for operating the yoke 73. A roller 92 carried by the lever-operating yoke 73 fits into the grooved guide member 91 and permits the yoke to be reciprocated relative to the arm 90 while maintaining an operative connection therewith for raising or lowering of the yoke. When the shaft 89 is rocked to raise the arm 90 and the lever-operating yoke 73, it brings the stock-gripping jaws 72 into engagement with the stock. When the arm and yoke are depressed in a similar manner, the stock-gripping jaws are released from engagement with the stock. The operation of the stock-gripping levers 68 and 68' in this manner is entirely independent of the operation of the means for reciprocating the feed although they necessarily operate in timed relation to each other.

The inherent resiliency of the rock shaft 89 permits the rock shaft to twist under torsional stresses such as may occur if an individual length of stock 20 varies in gauge or thickness within the usual limits or if a new length of stock varies in gauge or thickness from the preceding length of stock. This arrangement provides a stock-gripping mechanism which is not critical and which will operate properly despite some variations in the gauge or thickness of the stock.

The connecting rods 85 and 87 are slidably supported in an extension 83' of the bracket 83 and are operated in appropriately timed relation to the operation of the feed by any suitable means. In the illustrated embodiment they are operated by a double-faced cam 93, as shown in Figs. 15 and 16. The cam 93 may be driven by the main drive shaft 94 for the punch press 23 which has the usual fly wheel 95 thereon. The drive shaft 94 also drives a pulley 96 that engages with the V-belt 30, mentioned previously, for the driving slip-feed.

The cam 93 has a cam track cut in one face that is designed to operate the reciprocating parts in timed relation to the operation of the punch press. A cam follower 97 engaging with this cam track is slidably held in a depending yoke 97' that is supported from the drive shaft 94. The cam follower 97 is connected to the connecting rod 85 by an adjustable link 98 so as to reciprocate the connecting rod as the cam rotates.

The opposite face of the cam 93 has a cam track designed to operate the stock-gripping mechanism in timed relation to the reciprocating mechanism. A cam follower 99 engaging with this cam track is slidably held in a depending yoke 99' that is also supported from the drive shaft 94. The cam follower 99 is connected to the connecting rod 87 through an extensible linkage 100, the extension of which is controlled by an eccentric 101. The eccentric 101 has a handle 101' by means of which it may be turned. During normal operation, the linkage is not extended but, when desired, it may be extended by turning the handle 101' approximately 90 degrees, causing the connecting rod 87 secured thereto to be moved downwardly. This releases the gripping jaws and permits the withdrawal or insertion of stock in the feed.

*The positively operated, compensating hold-down*

When the stock 20 has been advanced and is released by a reciprocating feed, it is held against forward or backward movement by the positively operated, compensating hold-down 24, shown in Figs. 12, 13 and 14. The hold-down 24 permits the stock to be moved laterally in order to align the stock properly with the dies of the punch press 23. This compensates for camber in the stock such as may occur in slitting the stock from sheets or where the feed, for some reason, may not be running exactly true. A spring-held finger 102 or other suitable means may serve to move the stock laterally into alignment with the dies of the punch press.

The hold-down 24 consists of a frame 103 that is mounted on the support or bed plate 65. The frame 103 is located at the advance position of the reciprocating feed mechanism, portions of which may project into the frame at such position. At the forward end of the frame 103 there is a transversely movable member 104 having a slot 105 therein aligned to receive the stock 20 as it is fed forward. The slotted member 104 is mounted on ball bearings 106 in the frame so that it may move transversely of the frame. This movement need not be very large, but can be provided for as desired.

The transversely movable, slotted member 104 carries a stock-holding plunger 107 that extends into the slot 105 to hold the stock 20 against the bottom of the slot. The stock-holding plunger 107 is operated by a lever 108 that is pivotally mounted on an eccentric shaft 109. The eccentric shaft 109 is supported in the frame 103 and has a pressure releasing handle 110 attached thereto. By turning the handle 110, the pressure of the lever 108 on the stock-holding plunger 107 may be released so that the stock may be readily removed from or inserted in the hold-down.

The end of the lever 108 engaging with the stock-holding plunger 107 carries a roller 111 which engages with the top of the plunger and permits the plunger and its supporting member 104 to move laterally when the plunger 107 is held in engagement with the stock 20. The lever 108 is operated by a second plunger 112 that is supported on the frame 103.

The lever-operating plunger 112 is held in raised position by a spring 113 and is depressed against the force of the spring by an adjustable rod 114. The rod 114 may be adjusted for various gauges of stock and is connected to an arm 115 carrying a cam follower 116. The cam follower 116 carried by the arm 115 engages with a cam 117 on the main drive shaft 94.

The cam 117 is designed to operate the hold-down 24 in appropriately timed relation to the reciprocating feed and the punch press 23.

*Operation of the feed*

The operation of the feed has been described in detail in the foregoing and is briefly reviewed hereinafter. The strip stock 20 is initially engaged by the rolls 25 and 26 of the continuously driven slip-feed 21. The slip-feed 21 advances the length of stock entering the feed into the preceding length of stock. The slip-feed then feeds the stock to a position where the leading end of the stock may be engaged by one of the gripping elements of the reciprocating feed 22. The advance of the stock by the reciprocating feed is intermittent and the slip-feed serves to maintain the stock in its advanced position when it is not being advanced, and feeds it forward immediately upon any advance of the stock by the reciprocating feed.

The reciprocating feed 22 has dual stock-gripping elements that grip the stock 20 at spaced points so that adjoining lengths of stock are both positively advanced thereby. After the stock 20 has been gripped by the gripping elements, the reciprocating feed is moved forward a predetermined distance carrying the stock with it. When the reciprocating feed reaches its advanced position, the stock is released and the reciprocating feed is returned to its initial position to effect the next advance movement of the stock. In this mechanism the stock-gripping and reciprocable mechanisms are independently operated.

When the stock is released by the stock-gripping element, it is held against forward or backward movement by the positively operated, hold-down 24. The hold-down 24 is laterally movable and permits the stock to be aligned properly in relation to the dies of the punch press 23 or similar machine in order to compensate for possible camber or the like in the stock. The hold-down 24 continues to hold the stock while the punch press acts on the stock during which time the reciprocating feed is returned to its initial position. This feed is designed to advance strip stock continuously and accurately in step-by-step fashion for a predetermined distance at each step, and is particularly adapted to the feeding of lengths of flat stock in uninterrupted sequence.

It will be understood that various changes and modifications in the illustrated embodiment of the feed incorporating the invention may be made by those skilled in the art without departing from the scope of the invention as defined by the claims as appended hereto.

What I claim is:

1. In an apparatus of the character described, the combination of a reciprocable frame, a pair of intermittently operated levers pivotally mounted in the frame, stock-gripping jaws carried by said levers, said stock-gripping jaws being spaced apart lengthwise with respect to an elongated flat strip of stock being fed thereby and positioned to hold said strip of stock against a portion of the frame upon pivotal movement of the levers in one direction, an independently operable mechanism for reciprocating said frame to advance the stock held thereby a predetermined distance, a continuously driven slip-feed for feeding lengths of the strip stock in abutting relation to the stock-gripping jaws, and a hold-down for intermittently engaging with the stock to hold the stock in its advanced position when the stock is not gripped by said gripping jaws.

2. In an apparatus of the character described, the combination of a reciprocable frame, a pair of intermittently operated levers pivotally mounted in the frame, stock-gripping jaws carried by said levers, said stock-gripping jaws being spaced apart lengthwise with respect to an elongated flat strip of stock being fed thereby and positioned to hold said strip of stock against a portion of the frame upon pivotal movement of the levers in one direction, an independently operable mechanism for reciprocating said frame to advance the stock held thereby a predetermined distance, and a positively operated hold-down for intermittently engaging with the stock to hold the stock in its advanced position when the stock is not gripped by said gripping jaws.

3. In an apparatus of the character described, the combination of a reciprocable frame, a pair of intermittently operated levers pivotally mounted in the frame, stock gripping jaws carried by the levers, said gripping jaws being spaced apart lengthwise with respect to an elongated flat strip of stock being fed thereby and positioned to hold said strip of stock against a portion of the frame upon pivotal movement of the levers in one direction, an independently operable means for reciprocating the frame to advance the stock a predetermined distance, a continuously driven slip-feed for feeding lengths of strip stock in abutting relation to the stock-gripping jaws and a positively operated, transversely movable hold-down for intermittently engaging with the stock to hold the stock in its advanced position when the stock is not gripped by said gripping jaws.

4. In an apparatus of the character described, the combination of a reciprocable frame, a pair of intermittently operated levers pivotally mounted in the frame, stock-gripping jaws carried by the levers, said gripping jaws being spaced apart lengthwise with respect to an elongated flat strip of stock being fed thereby and positioned to hold said strip of stock against a portion of the frame upon pivotal movement of the levers in one direction, an independently operable means for reciprocating the frame to advance the stock a predetermined distance, and a positively operated, transversely movable hold-down for intermittently engaging with the stock to hold the stock in its advanced position when the stock is not gripped by said gripping jaws.

5. In an apparatus of the character described, a reciprocable frame, a pair of levers pivotally mounted in said frame, stock-gripping jaws carried by said levers, said gripping jaws being spaced apart lengthwise with respect to an elongated flat strip of stock being fed thereby and positioned to hold said strip of stock against a portion of the frame upon pivotal movement of the levers in one direction and a positively operated hold-down intermittently engaging with the stock for holding said stock against movement when the stock is not gripped by said gripping jaws.

6. In an apparatus of the character described, a reciprocable frame, a pair of levers pivotally mounted in said frame, stock-gripping jaws carried by said levers, said gripping jaws being spaced apart lengthwise with respect to an elongated flat strip of stock being fed thereby and positioned to hold said strip of stock against a portion of the frame upon pivotal movement of the levers in one direction and a transversely movable, positively operated hold-down intermittently engaging with the stock for holding the stock against forward or backward movement when the stock is not gripped by said gripping jaws.

7. In an apparatus of the character described, a reciprocable frame, a pair of levers pivotally mounted in said frame, stock-gripping jaws carried by said levers, said gripping jaws being spaced apart lengthwise with respect to an elongated flat strip of stock being fed thereby and positioned to hold said strip of stock against a portion of the frame upon pivotal movement of the levers in one direction, a continuously driven slip-feed for feeding elongated lengths of stock with their adjoining ends in abutting relation to the stock-gripping jaws and a positively operated hold-down intermittently engaging with the stock for holding said stock against movement when the stock is not gripped by said gripping jaws.

8. In an apparatus of the character described, a reciprocable frame, a pair of levers pivotally mounted in said frame, stock-gripping jaws carried by said levers, said gripping jaws being spaced apart lengthwise with respect to an elongated flat strip of stock being fed thereby and positioned to hold said strip of stock against a portion of the frame upon pivotal movement of the levers in one direction, a continuously driven slip-feed for feeding elongated lengths of stock with their adjoining ends in abutting relation to the stock-gripping jaws and a transversely movable, positively operated hold-down intermittently engaging with the stock for holding the stock against forward or backward movement when the stock is not gripped by said gripping jaws.

9. In an apparatus for feeding strip stock, a reciprocable stock-gripping and advancing mechanism comprising a reciprocable frame, a pair of levers pivotally mounted at spaced points on said frame, with one end of each of said levers being positioned in opposing relation to one end of the other lever, a stock gripping jaw carried at the other end of each of said levers and opposing a portion of the frame, said stock-gripping jaws being spaced apart lengthwise with respect to an elongated length of strip stock and positioned to grip the stock in cooperation with the opposing portion of the reciprocable frame upon pivotal movement of the levers in one direction, and a common operator for said levers.

10. In an apparatus for feeding strip stock, a reciprocable stock-gripping and advancing mechanism comprising a reciprocable frame, a pair of levers pivotally mounted on said frame, stock gripping jaws carried by said levers and opposing a portion of the frame, said stock gripping jaws being spaced apart and positioned to grip the stock in cooperation with the opposing portion of the reciprocable frame upon pivotal movement of the levers in one direction, a common operator for said levers and a rock shaft capable of yielding torsionally connected to said common operator for moving said levers and the jaws carried thereby into and out of stock-gripping position.

11. In an apparatus for feeding strip stock, a reciprocable stock-gripping and advancing mechanism comprising a reciprocable frame, a pair of levers pivotally mounted on said frame, stock gripping jaws carried by said levers and opposing a portion of the frame, said stock gripping jaws being spaced apart and positioned to grip the stock in cooperation with the opposing portion of the reciprocable frame upon pivotal movement of the levers in one direction, a common operator for said levers, a rock shaft capable of yielding torsionally connected to said common operator for moving said levers and the jaws carried thereby into and out of stock-gripping position, and an independently operated linkage for reciprocating said frame between an advanced and stock-receiving position.

12. An apparatus of the type described for feeding strip material, characterized by a positively operated hold-down for securing strip stock at appropriate times from moving in a forward or backward direction but permitting lateral movement of the stock so held, said hold-down having a fixed frame, a stock receiving member supported on said frame, said stock receiving member being laterally movable relative to said frame, and a stock-engaging plunger carried by said stock receiving member, said plunger being operable to engage said stock in conjunction with said stock receiving member.

13. In an apparatus for feeding strip stock, the combination of a reciprocable frame, a pair of levers pivotally mounted on said frame, stock gripping jaws carried by said levers and opposing a portion of the frame, said stock gripping jaws being spaced apart and positioned to grip the stock in cooperation with the opposing portion of the reciprocable frame upon pivotal movement of the levers in one direction, a common operator for said levers and a positively operated, laterally movable hold-down for intermittently securing the stock against forward or backward movement, said hold-down including a fixed frame, a stock receiving member supported on said frame, said stock receiving member being laterally movable relative to said frame, and a stock engaging plunger carried by said stock receiving member, said plunger being operable to engage said stock in conjunction with said stock receiving member.

14. In an apparatus for feeding strip stock the combination of a reciprocable frame, a pair of levers pivotally mounted on said frame, stock gripping jaws carried by said levers and opposing a portion of the frame, said stock gripping jaws being spaced apart and positioned to grip the stock in cooperation with the opposing portion of the reciprocable frame upon pivotal movement of the levers in one direction, a common operator for said levers, a torsionally yieldable rock shaft slidably connected to said common operator for moving said operator and the levers carried thereby into and out of stock gripping position, and an intermittently operated, laterally movable hold-down for securing the stock against forward or backward movement, said hold-down including a fixed frame, a stock receiving member supported on said frame, said stock receiving member being laterally movable relative to said frame, and a stock engaging plunger carried by said stock receiving member, said plunger being operable to engage said stock in conjunction with said stock receiving member.

15. In an apparatus of the character described, the combination of a reciprocable frame, a pair of intermittently operated levers pivotally mounted in the frame, stock gripping jaws carried by the levers, said gripping jaws being spaced apart and positioned to grip a strip of stock against a portion of the frame upon pivotal movement of the levers in one direction, an independently operable means for reciprocating the frame to advance the stock a predetermined distance, a continuously driven slip-feed for feeding lengths of strip stock in abutting end to end relation to the stock gripping jaws, an intermittently operated, laterally movable hold-down for engaging with the stock to hold the stock in its advanced position, said hold-down including a fixed frame, a stock receiving member supported on said frame, said stock receiving member being laterally movable relative to said frame, and a stock engaging plunger carried by said stock receiving member, said plunger being operable to engage said stock in conjunction with said stock receiving member.

16. In an apparatus for feeding strip stock, the combination of a reciprocable frame, a pair of levers pivotally mounted on said frame, stock gripping jaws carried by said levers and opposing a portion of the frame, said stock gripping jaws being spaced apart and positioned to grip the stock in cooperation with the opposing portion of the reciprocable frame upon pivotal movement of the levers in one direction, a common operator for said levers, a torsionally yieldable rock shaft slidably connected to said common operator for moving said operator and the levers carried thereby into and out of stock gripping position, a continuously driven, one-way slip-feed for feeding lengths of stock in abutting end to end relation to the stock gripping jaws and an intermittently operated, laterally movable hold-down for holding the stock in advanced position, said hold-down including a fixed frame, a stock receiving member supported on said frame, said stock receiving member being laterally movable relative to said frame, and a stock engaging plunger carried by said stock receiving member, said plunger being operable to engage said stock in conjunction with said stock receiving member.

GEORGE SCHER.

REFERENCES CITED

The following references are of record in the file of this patent:

UNITED STATES PATENTS

| Number | Name | Date |
| --- | --- | --- |
| 763,195 | Marz | June 21, 1904 |
| 1,375,889 | Baltzley | Apr. 26, 1921 |
| 1,513,106 | Gruman | Oct. 28, 1924 |
| 1,587,639 | Fleischer | June 8, 1926 |
| 1,693,606 | Jones | Dec. 4, 1928 |
| 1,702,185 | Weber | Feb. 12, 1929 |
| 2,096,073 | Spencer | Oct. 19, 1937 |
| 2,222,168 | Brooks | Nov. 19, 1940 |
| 2,372,499 | Kerner | Mar. 27, 1945 |
| 2,408,064 | Hall | Sept. 24, 1946 |
| 2,435,308 | Harvey | Feb. 3, 1948 |